(12) United States Patent
Langguth et al.

(10) Patent No.: US 6,619,721 B1
(45) Date of Patent: Sep. 16, 2003

(54) COVERING OF THE CONVERTIBLE TOP COMPARTMENT OF A CONVERTIBLE MOTOR VEHICLE

(75) Inventors: Martin Langguth, Rochester Hills, MI (US); Tom Murray, Columbiaville, MI (US); Steve Klotz, Commerce Township, MI (US); Michael McIsaac, Chesterfield Township, MI (US)

(73) Assignee: Webasto Roof Systems Inc., Rochester Hills, MI (US)

( * ) Notice: Subject to any disclaimer, the term of this patent is extended or adjusted under 35 U.S.C. 154(b) by 0 days.

(21) Appl. No.: 10/085,623

(22) Filed: Mar. 1, 2002

(51) Int. Cl.[7] .............................................. B62D 25/06
(52) U.S. Cl. ..................... 296/136; 296/76; 296/107.08
(58) Field of Search ...................... 296/136, 76, 107.08

(56) References Cited

U.S. PATENT DOCUMENTS 5,067,768 A * 11/1991 Fischbach .............. 296/107.08
5,620,226 A * 4/1997 Sautter, Jr. ............. 296/107.08

FOREIGN PATENT DOCUMENTS

| DE | 298 12 164 U1 | 5/1999 |
| DE | 298 02 871 U1 | 6/1999 |
| DE | 299 21 497 U1 | 3/2000 |

* cited by examiner

Primary Examiner—D. Glenn Dayoan
Assistant Examiner—Lori L Coletta
(74) Attorney, Agent, or Firm—Nixon Peabody LLP; David S. Safran

(57) ABSTRACT

A covering of a convertible top compartment of a convertible which has a convertible top which can be deposited in a convertible top compartment, the covering having at least one first cover part and one second cover part which are supported to be able to pivot relative to one another. Here, it is provided that the covering (4) can be displaced by a displacement arrangement between a closed position in which the convertible top (2) is deposited in the convertible top compartment (5) and the first cover part (14) and the second cover part (15) form a flat covering for the opening (37) of the convertible top compartment, an intermediate position in which the first cover part (14) and the second cover part (15) at least partially overlap and are removed from the opening (37) of the convertible top compartment to a location underneath the path of motion of the opening or closing convertible top (2), and a deposited position in which the first cover part (14) and the second cover part (15) are located under the closed convertible top (2) essentially lying on top of one another.

15 Claims, 9 Drawing Sheets

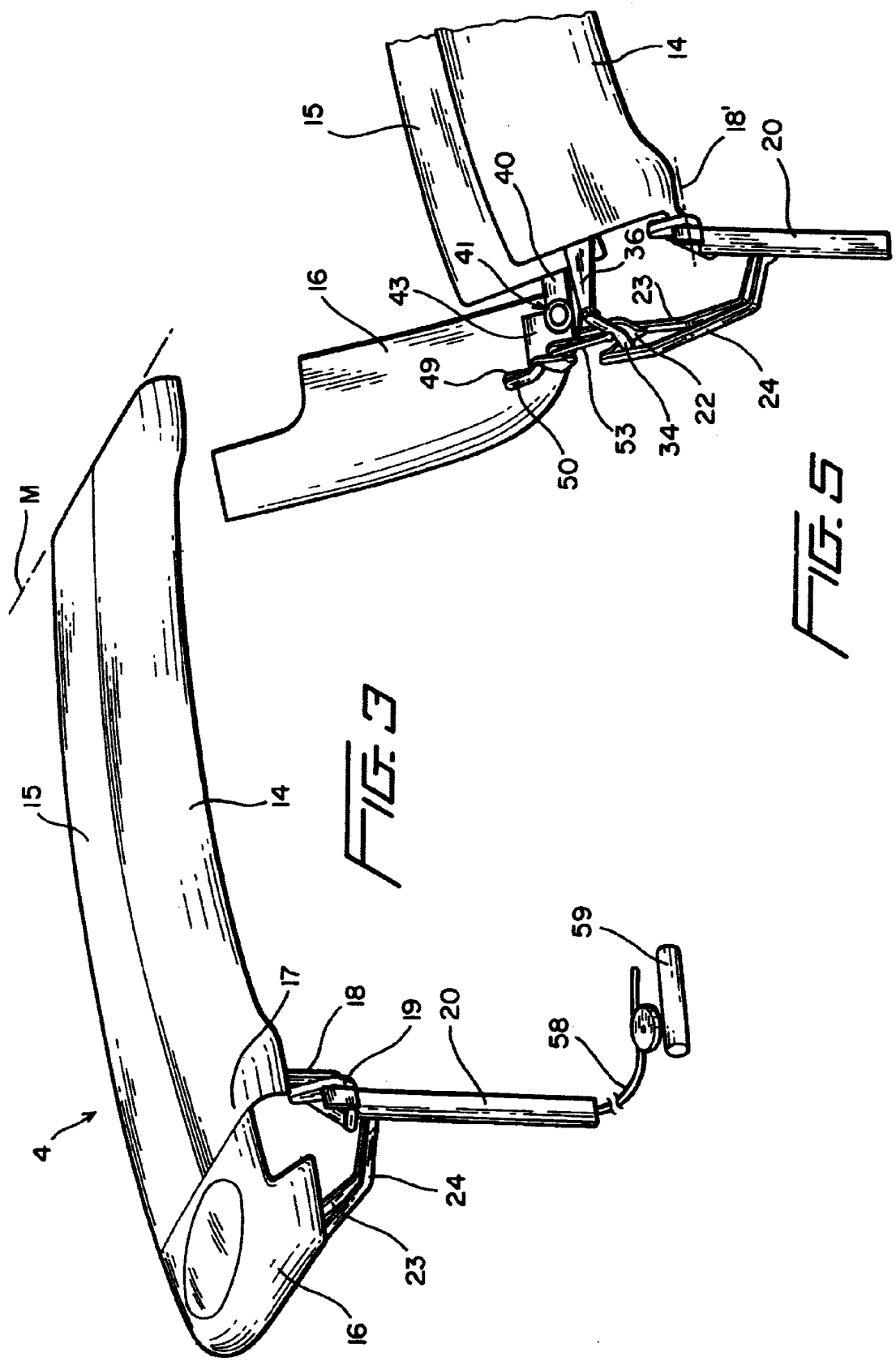

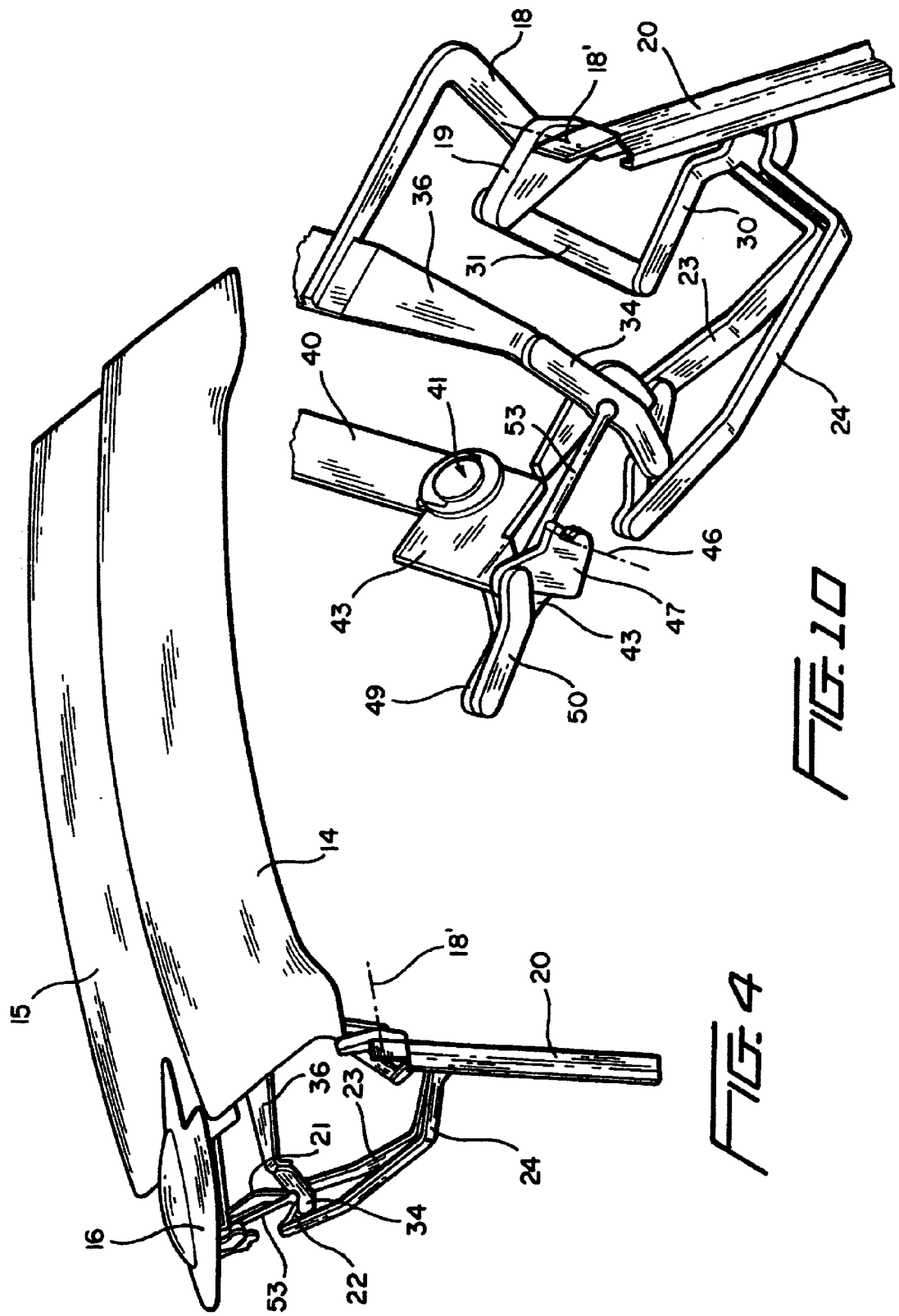

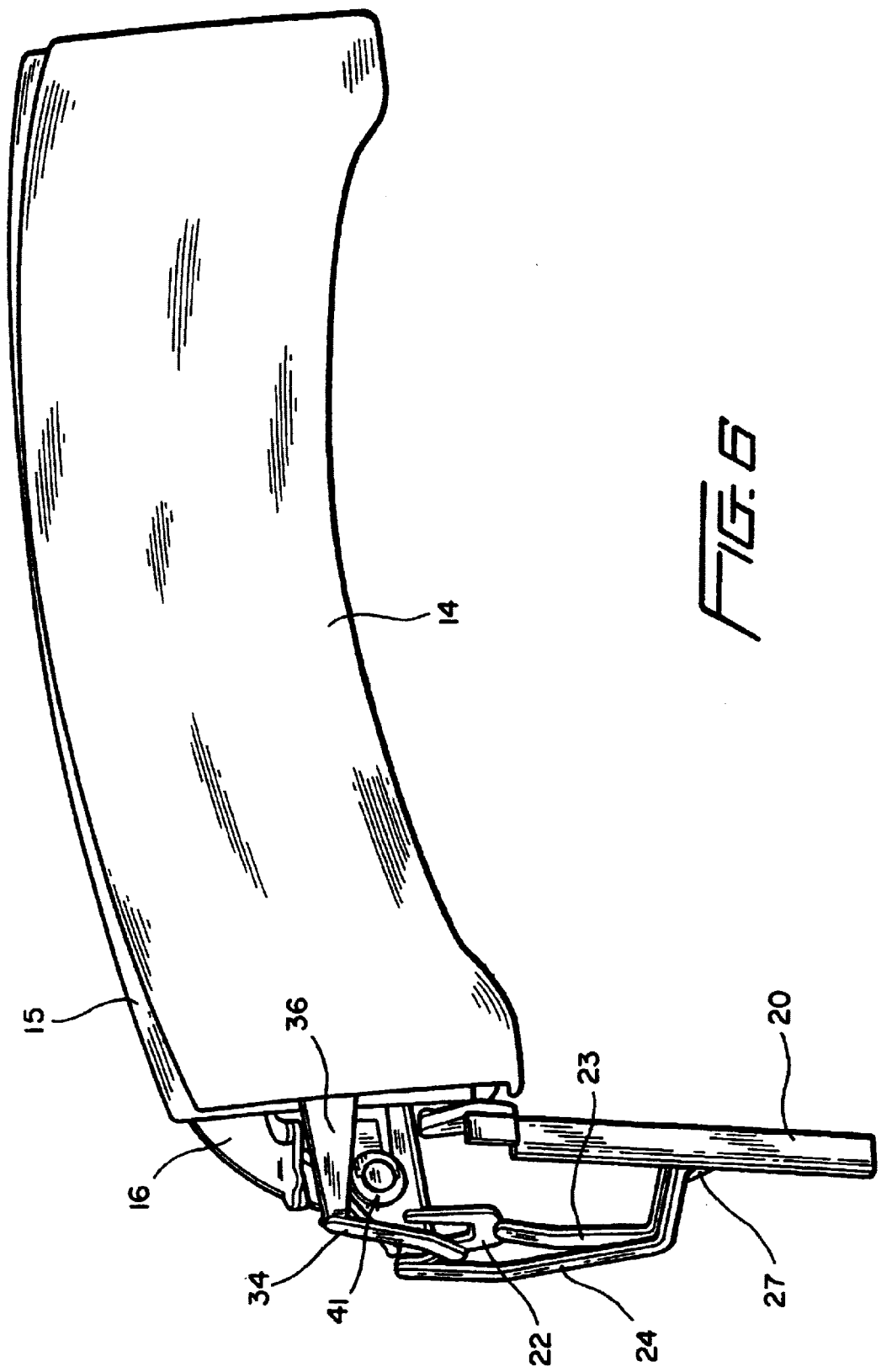

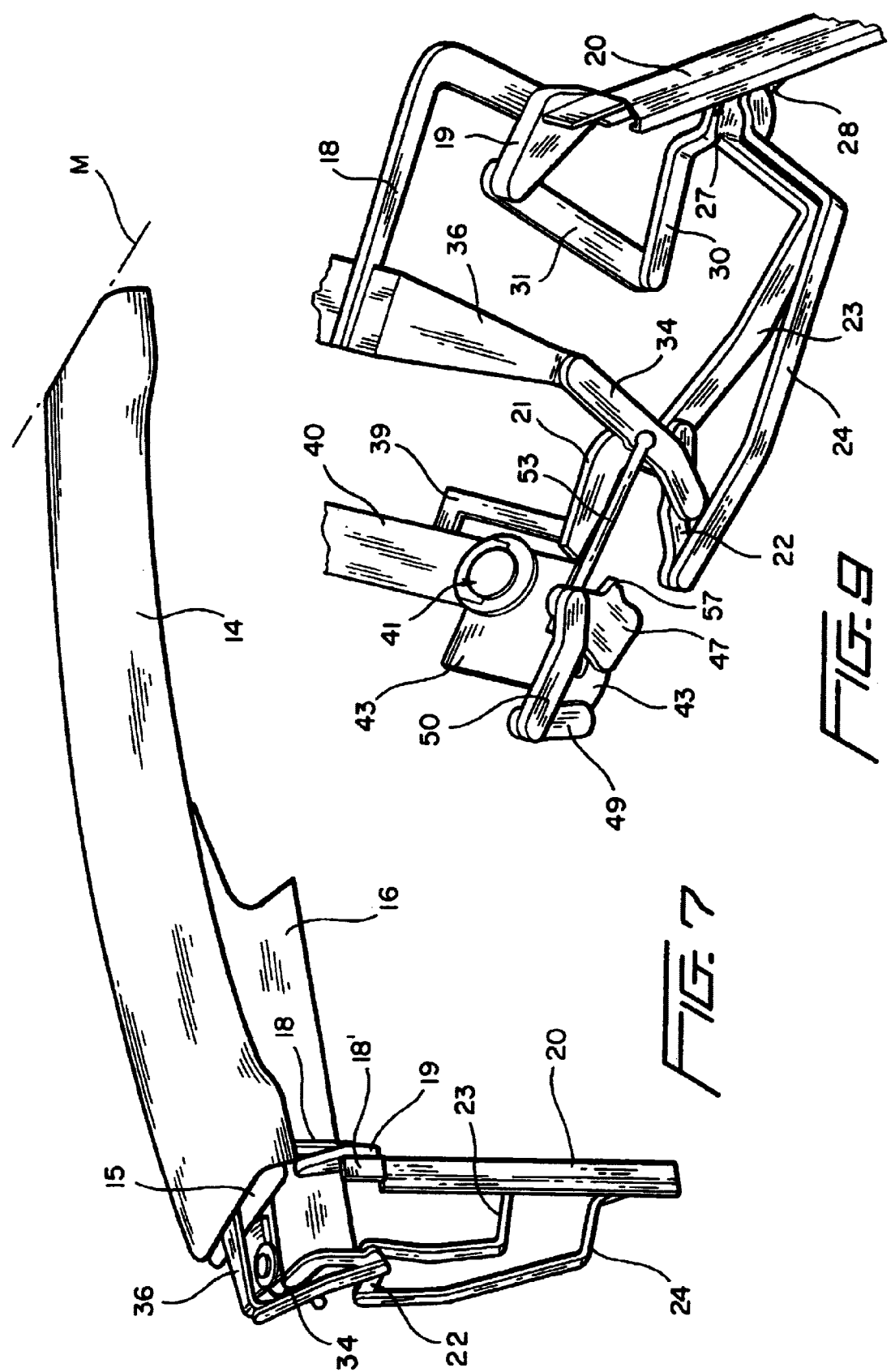

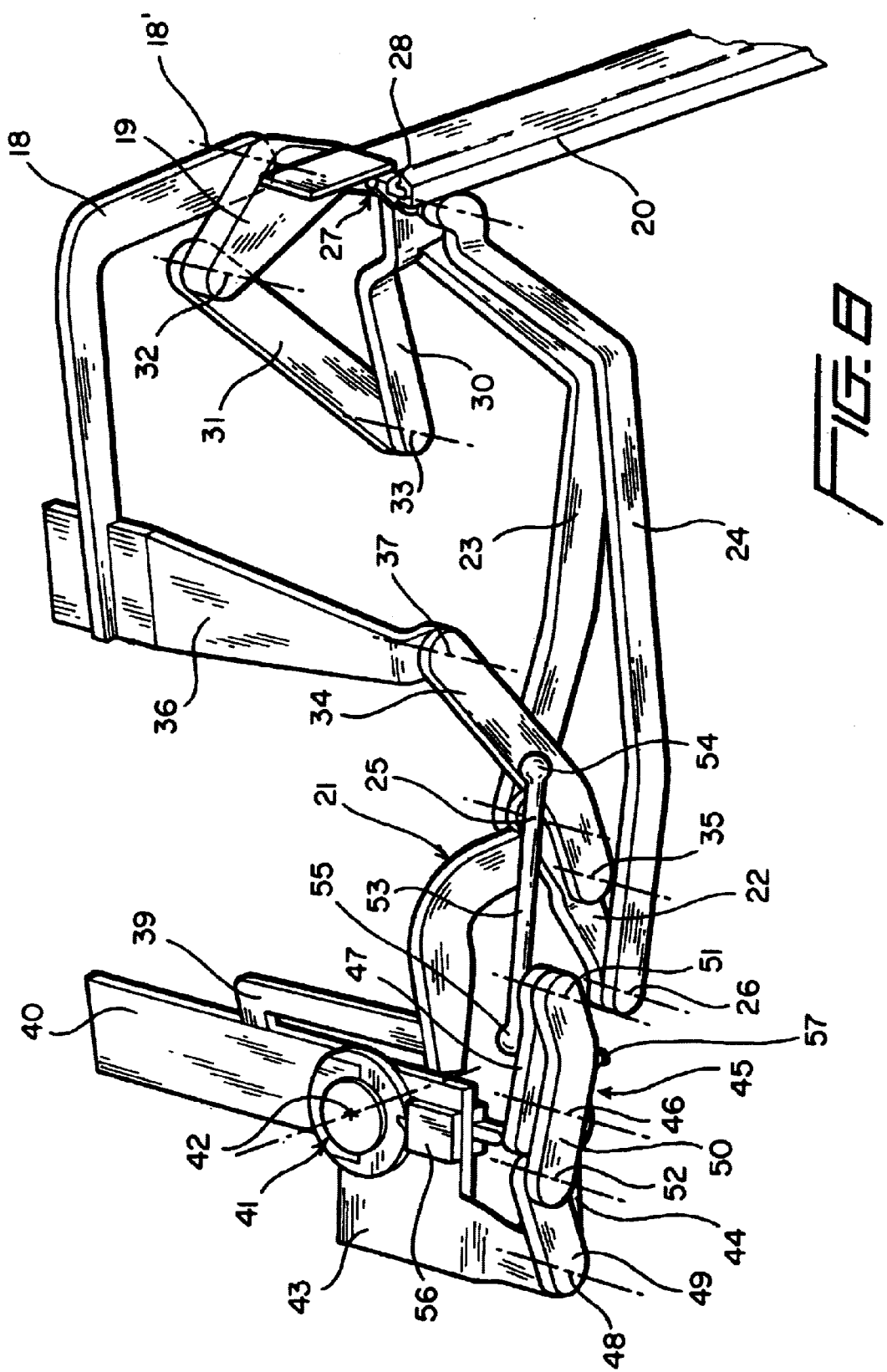

COVERING OF THE CONVERTIBLE TOP COMPARTMENT OF A CONVERTIBLE MOTOR VEHICLE

BACKGROUND OF THE INVENTION

1. Field of the Invention

The invention relates to the covering of the convertible top compartment of a convertible type motor vehicle which has a convertible top which can be deposited in the convertible top compartment, the covering having at least one first cover part and one second cover part which are supported to be able to pivot relative to one another.

2. Description of the Related Art

German Utility Model DE 298 02 871 U1 discloses covering of the initially mentioned type which has two cover parts located in succession in the middle, the cover parts being flanked by lateral cover parts. The two front lateral cover parts are coupled on the opening edge of the convertible top compartment to be able to pivot around two axes which are aligned parallel to the direction of travel. The two successive middle cover parts can be pivoted relative to one another around transverse pivot axes at their bottoms and can be raised vertically. The two rear lateral cover parts are coupled to be able to pivot around lengthwise axes on the rear middle cover part. By means of a manually actuated connecting rod means, the covering can be moved between its closed position and its open position.

German Utility Model DE 299 21 497 U1 describes the lateral rod assembly flap of a covering for a convertible folding top which has at least two sections which can be displaced relative to one another, especially two component flaps which are supported to be able to pivot relative to one another.

German Utility Model DE 298 12 164 U1 discloses the cover of a convertible top compartment of a convertible which has at least two lateral side parts which can be pivoted relative to the main part of the cover of the convertible top compartment and each of which can cover or clear a through opening for the rod assembly parts of the convertible top, depending on its location.

SUMMARY OF THE INVENTION

The primary object of the present invention is to devise a covering of the initially mentioned type which can be changed from a large-area cover position with the convertible top opened into a comparatively small lowered position for a convertible top which is closed over the interior of the motor vehicle.

The object is achieved in/accordance with the invention in that the covering can be displaced by a displacement means between a closed position in which the convertible top is deposited in the convertible top compartment and the first cover part and the second cover part form a flat covering for the opening of the convertible top compartment, an intermediate position in which the first cover part and the second cover part are removed from the opening of the convertible to p compartment, at least partially overlapping and located underneath the path of motion of the opening or closing convertible top, and a deposited position in which the first cover part and the second cover part are located under the closed convertible top essentially lying on top of one another. Thus, the covering which has at least two cover parts can be transferred out of a large-area closed arrangement in the opening of the convertible top compartment into a comparatively densely packed and space-saving arrangement which is located in front of the convertible top, while it is being extended from the convertible top compartment or is being deposited in it. The cover parts, which are positioned stacked on one another in a/space-saving arrangement, can be moved, for example, by pivoting around a fixed pivot axis into their intermediate position in which they are located essentially vertically or also inclined, for example, behind the seats.

Due to its comparatively low height, in the intermediate position, the convertible top can be moved away/over it. In the closed position of the convertible top, then, the cover parts, in a stacked state, can be moved, for example, into a horizontal position between the seats and the bottom end of the convertible top and assume the function of a hat shelf which covers the front part of the convertible top compartment towards the interior of the motor vehicle.

The object is achieved in the initially mentioned cover also in that the first cover part is the front cover part and the second cover part is the rear cover part which are located in the closed position in a transverse alignment behind one another, and upon opening, are located at least partially overlapping one another in the same direction. Thus, the cover parts are not pivoted relative to one another, for example, with their insides against one another, but their top sides face in the same direction.

The object is furthermore also achieved in the initially mentioned covering in that, according to the invention, the first cover part is at least the middle cover part and the second cover part is a lateral cover part that is supported, in the closed position, on each of the two opposing lateral outside edges of the middle cover part, and upon opening, can be pivoted relative to the middle cover part around two pivot axes. The motion via the two pivot axes allows an improved, variable, lowering motion of the lateral cover part to under or over the middle cover part to which it is assigned and on which it is preferably pivotally supported.

Preferably, the first cover art is the front cover part and the second cover part is the rear cover part and they are located behind one another in the closed position in a transverse alignment in the lengthwise direction of the motor vehicle.

In an alternative embodiment, the first cover part is at least the middle cover part and the second cover part is present twice and is located as a lateral cover part in the closed position on each of the two opposite outside edges of the middle cover part. Thus, wide openings of the convertible top compartment can also be closed by a covering which can be transferred into a space-saving arrangement which is shortened in the transverse direction so that this arrangement can be positioned under the closed convertible top, the pivoted-in or folded-in lateral cover parts offering a passage space for the rod assembly bearing parts. Both during opening and closing of the convertible top, the rod assembly bearing parts move in the passage area or a through opening on the respective top side edge area of the motor vehicle which can be closed by the lateral cover part with the convertible top deposited.

Feasibly, the front cover part is supported to pivot around a front transverse axis on the body-mounted bearing means and can be swung by a connecting rod means which is movably supported, on the one hand, on a guide or guide rail by a drive means, and on the other hand, is pivotally connected to the front cover part. When the front transverse axis of the front cover part is located on the guide, not fixed, but movably, the front cover part, preferably together with at least one other cover part, can be displaced especially downward when the covering is opened on this guide.

In one preferred embodiment, the connecting rod means contains a multi-bar or four-bar mechanism arrangement which is pivoted around its support on the guide rail by forced control when moved along the guide rail and in doing so swings the front cover part via a connecting arm.

Feasibly, the two connecting rods of the four-bar mechanism arrangement are pivotally mounted on the carrier part of the rear cover part in hinges which are spaced apart from one another, and when they are moved along the guide rail they are pivoted relative to one another, by which the carrier part, and thus, the rear cover part are pivoted in a superimposed pivoting motion.

To execute the deposition motion, it is advantageous if the connecting arm is pivotally supported on the carrier part and on the front cover part. However, there can also be different bearing and hinge arrangements.

Feasibly, the two connecting rods of the four-bar mechanism arrangement are each pivotally supported on a carriage, the carriages are movably supported on a guide rail, and in the initial displacement motion which moves the cover parts from the closed position into the intermediate position, they are moved coupled to one another. To further move the cover parts into the deposited position, one connecting rod is moved further on the guide rail, while the other connecting rod is kept locked by means of its carriage on the guide rail so that the two cover parts are pivoted back into the deposited position via the pivoting of the carrier part.

It is provided in one preferred embodiment that the second cover part or the side part is supported to be able to pivot around the first pivot axis on the first cover part or rear cover part such that it can be swung down out of the closed position in the opposite direction to the pivoting motion of the rear cover part with its top into the swing-out position, and in doing, so can be displaced to a level underneath or above the rear cover part, and that the side part is supported to be able to pivot around the second pivot axis of a pivot joint which is supported on the rear cover part such that it can be pivoted out of its swing-out position to under or over the rear cover part. In doing so, the side part can be attached to the retaining rod of a rod mechanism which is coupled to the connecting arm and is moved controlled by it.

It is also possible for the rod mechanism to be movably supported on a bearing part which is kept locked during the displacement motion of the side part into the swing-out position on the pivot axis. In the swing-out position, the rod mechanism is in its end position, and after unlocking the pivot axis, the bearing part with the side part held on it can be swung to under or also over the rear cover part, or with the corresponding support, also the front cover part.

In one especially simple embodiment, the cover parts are supported via their bearing means on two guides or guide rails which are laterally opposite one another with respect to the motor vehicle and which are located, for example, laterally behind the seats. The guides or guide rails can run essentially vertically on the motor vehicle, and thus, require little space.

One embodiment of the covering is explained in detail below with reference to the accompanying the drawings.

DESCRIPTION OF THE DRAWINGS

FIG. 3 is a perspective top view of the right half of a covering which covers the convertible top compartment, which contains a front cover part, a rear cover part and a side cover part, each with its right bearing and adjustment means, in the closed position;

FIG. 4 is a view of the covering shown in FIG. 3 with the covering moved along a first displacement path;

FIG. 5 shows the covering of FIG. 4 moved along a further displacement path, the lateral cover part having been pivoted to the rear around a transverse axis;

FIG. 6 shows the covering of FIG. 5 with the covering moved along a further displacement path, the lateral cover part having been pivoted to under the rear cover part of the covering so that the cover parts are essentially vertically aligned;

FIG. 7 shows the covering of FIG. 6 with the covering moved along a further displacement path into a horizontal cover position (with the convertible top closed);

FIG. 8 is a perspective top view of the bearing and displacement means for the front, the rear and the lateral cover part for the closed position of the covering shown in FIG. 3;

FIG. 9 is a perspective top view of the bearing and displacement means for the intermediate position of the covering shown in FIG. 4;

FIG. 10 is a perspective top view of the bearing and displacement means for the intermediate position of the covering as shown in FIG. 5;

DETAILED DESCRIPTION OF THE INVENTION

Figure 1:
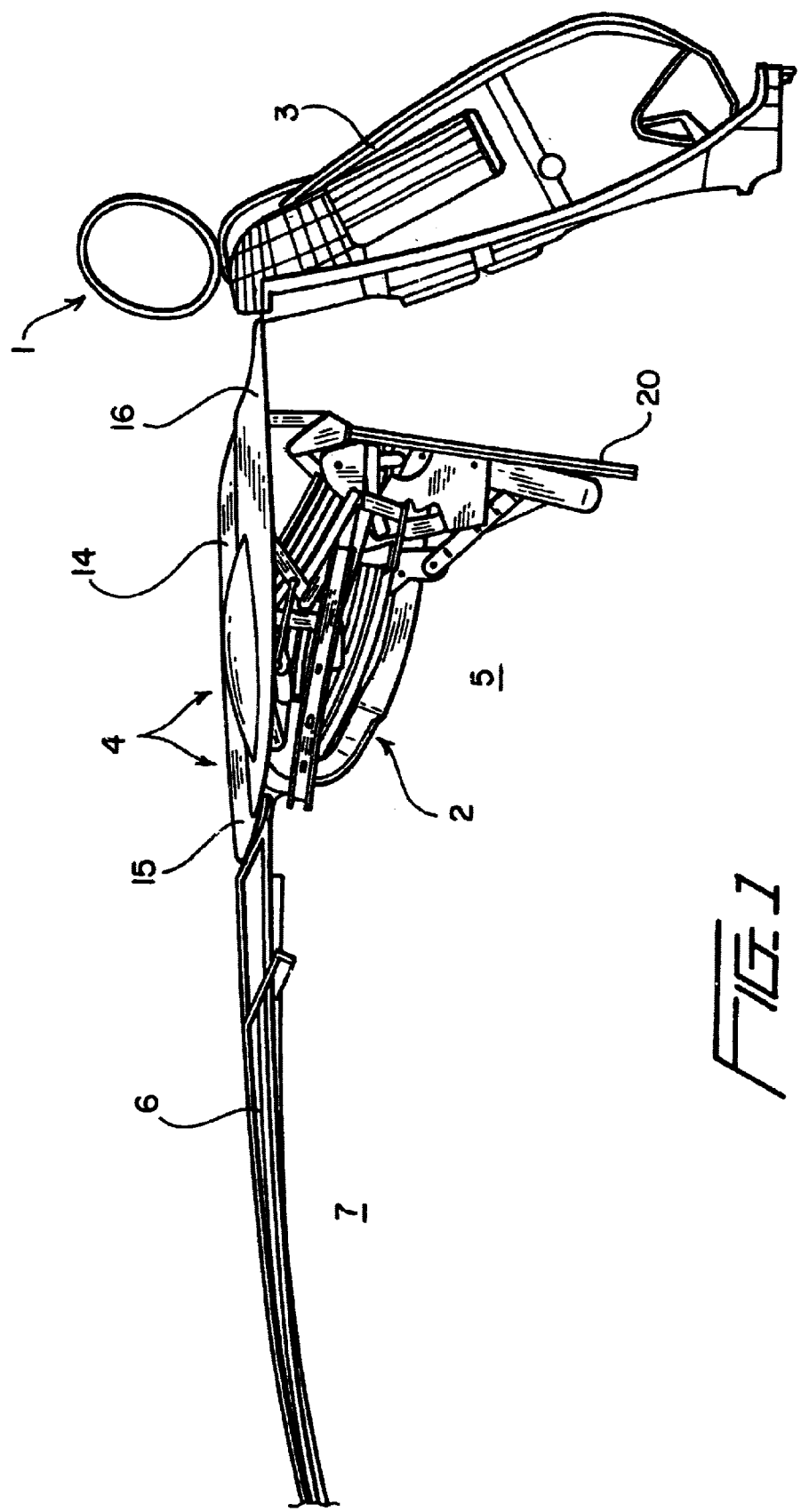
FIG. 1 is a schematic side view of the rear area of a convertible with a covering which covers an opened convertible top which has been deposited in the convertible top compartment.
Figure 2:
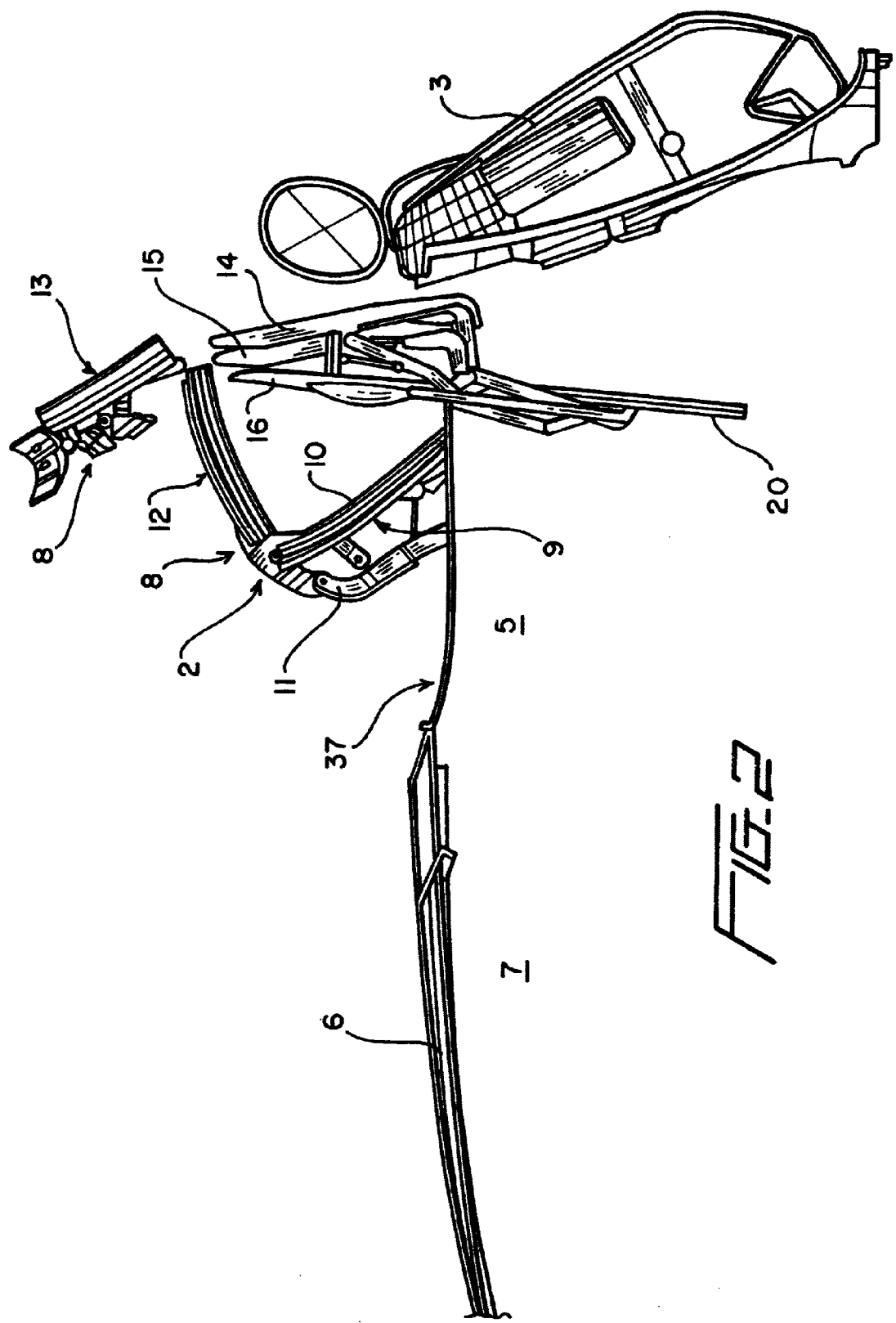
FIG. 2 is a side view of the rear area of a convertible as shown in FIG. 1, but, with the covering having been moved into the intermediate position in which the convertible top can be moved out of the convertible top compartment into its closed position.

A convertible 1 with a rear area shown schematically and in extract form in FIGS. 1 & 2 contains a convertible top 2 which is covered with a top fabric (in FIGS. 1 and 2, only the convertible top rod assembly without the top fabric is shown), especially a folding convertible top which can be displaced in a known manner between its closed position (not shown) in which it extends from the top edge of the windshield over the motor vehicle interior and the seats 3 to the rear as far as the rear convertible top compartment 5, and its open position (FIG. 1) in which it has been deposited in the convertible top compartment 5 and covered by the covering 4 of the convertible top compartment 5, which covering is located on the top opening 37 of the compartment 5. The convertible top compartment 5 is located in front of the trunk space 7 which is covered by a trunk lid 6 or it occupies the front section of the trunk space 7.

The convertible top 2 contains a foldable convertible top rod assembly 8 (see FIG. 2) with rod assembly bearing parts which are located on both sides and which movably support the convertible top 2 on the body. The rod assembly bearing parts contain, for example, a main column 9, with a window seal 10 which is supported on it and to which is also attached the convertible top fabric, and a main connecting rod 11. The main column 9 and connecting rods 11, in the conventional manner, form a four-bar pivot mechanism arrangement and pivotally support a middle convertible top part 12, and a front convertible top part 13 which is pivotally coupled to the middle convertible top part 12.

The covering 4 of the convertible top compartment 5 contains a front cover part 14 and a rear cover part 15 (see FIGS. 1 & 3) which extend transversely relative to the lengthwise center line of the motor vehicle, and a left lateral cover part (not shown in FIGS. 3 to 13) and a right lateral cover part 16. When the convertible top 2 has been deposited in the convertible top compartment 5, the four cover parts 14, 15, 16 form a flat covering 4 of the convertible top 2 (FIG. 3) or the opening 37 of the convertible top compartment. As a result of the arrangement of the cover 4 which is symmetrical to the lengthwise center line M of the motor vehicle the description is made essentially using the right half of the cover 4 and its assigned bearing and adjustment means.

The front cover part 14 is pivotally supported on its lateral outside edge section 17 via a support part 18 which projects down from the front cover part 14 (see also FIGS. 8 to 14, only in FIG. 11 the front cover part 14, the rear cover part 15 and the lateral cover part 16 being shown) on the head bearing part 19 of a roughly vertical bearing rail 20 of the bearing and adjustment means for the covering 4, such that the top of the front cover part 14 can be pivoted forward out of the roughly horizontal cover position (FIG. 3) (FIGS. 2 & 4 to 6). The bearing rail 20 is mounted in the respective side area of the body spaced away from the seats 3 of the motor vehicle.

A carrier part 21 spaced away from its lateral outside end is securely mounted on the rear cover part 15 via a brace 39 (see FIG. 9) and a support part 40. The carrier part 21 is formed, for example, in a roughly U-shape and is located in the vertical lengthwise plane such that the lower leg 22 of the carrier part 21 is pointed to the rear. The carrier part 21, and thus, the rear cover part 15 are pivotally held by the main connecting rod 23 and an auxiliary connecting rod 24 which together with the leg 22 form a four-bar mechanism arrangement in a front hinge 25 or rear hinge 26 located on the lower leg 22. The main connecting rod 23 and the auxiliary connecting rod 24 are bent inward at right angles towards their opposing ends and are pivotally mounted on the respective carriages 27 and 28 which are movably supported on a guide 29 of the vertical bearing rail 20 and can be moved by a drive means, for example, a drive cable 58 which can be driven by a drive motor 59 (see FIG. 3). The main connecting rod 23 contains a permanently mounted control leg 30 or one made in one piece, which, in a side top view, is located on the carriage-side end of the main connecting rod 23, for example, at an angle to it.

A connecting arm 31 is, on the one hand, pivotally connected to the head bearing part 19, and on the other, to the control leg 30 in the hinges 32, 33.

As can be seen in FIG. 8, another connecting arm 34 is pivotally coupled at one end to the lower leg 22 of the carrier part 21 at a hinge 35 which is located between the two hinges 25, 26 of the main connecting rod 23 and the auxiliary rod 24, and at the other end is pivotally coupled to a rear carrier 36 which projects laterally from the front cover part 14 by a hinge 37.

In the closed position of the cover 4 (FIG. 3 & 8), the carriages 27, 28 of the main connecting rod 23 and the auxiliary connecting rod 24 coupled to one another are held in the top position on the bearing rail 20, for example, by the drive cable or a drive rod of the drive means. When the carriages 27, 28 which are coupled to one another are lowered (FIGS. 9 to 11), the connecting arm 31 pivots the control leg 30 of the main connecting rod 23 forward against the vertical bearing rail 20 so that, at the same time, the main connecting rod 23 also pivots forward around its pivot bearing on the carriage 27. Since the main connecting rod 23 and the auxiliary connecting rod 24 together with the leg 22 form a multi-bar mechanism or a four-bar mechanism, according to the chosen layout of the four-bar mechanism, the lower leg 22 of the carrier pad 21, and thus the rear cover part 15, are raised and pivoted forward. At the same time, the other connecting arm 34 entrains the front cover part 14 and pivots it around its pivot bearing axis 18' on the head part 19 of the vertical bearing rail 20.

The two coupled carriages 27, 28 are moved down by the drive means into an intermediate position (see FIGS. 2 & 13) in which, in the interplay of the described connecting rods and levers, the front cover part 14 is swung into a roughly vertical position and the rear cover part 15 is swung by the pivoted main and auxiliary connecting rods 23, 24 which have been moved down onto the bottom of the front cover part 14 roughly congruently to it.

On the support part 40, which projects laterally from the rear cover part 15, by means of a swivel hinge 41 which has a swivel axis 42 which is roughly perpendicular to the rear cover part 15, a carrier part 43 is pivotally supported; on its outer side wall 44 which is angled down, a rod mechanism 45 is pivotally mounted. The rod mechanism 45 contains a front control rod 47 which can be pivoted around a hinge 46, a rear retaining rod 49 which can be pivoted around a hinge with the pivot axis 48, and a connecting arm 50 which couples the control rod 47 and the retaining rod 49 to one another by hinges 51, 52. A coupling rod 53 is pivotally coupled at one end to/the connecting arm 34 of the front cover part 14 in a ball-and-socket joint 54 and at the other end to the control rod 47 in another ball-and-socket joint 55.

The lateral cover part 16 is mounted on the retaining rod 49 such that, in the position of the rod mechanism 45 and the adjustment means for the front and rear cover parts 14, 15 shown in FIG. 8, the lateral cover part 16 is located superficially flush with the front and rear cover parts 14, 15.

Figure 13:
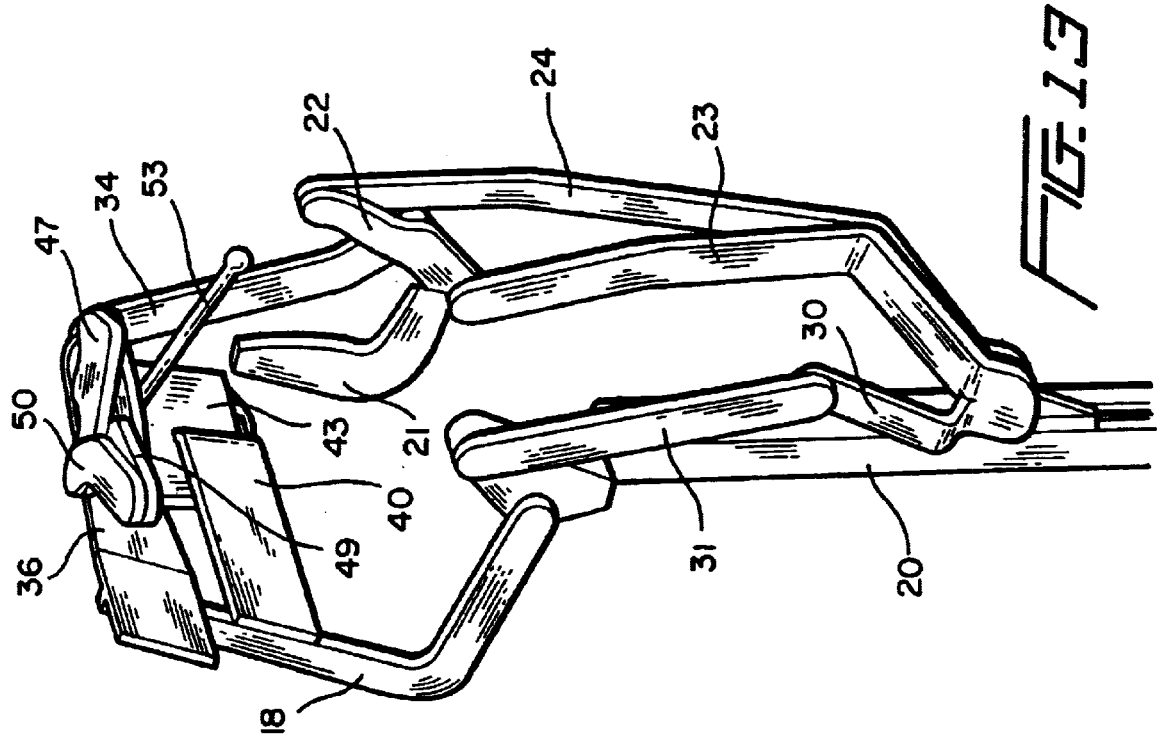
FIG. 13 is a perspective top view of the bearing and displacement means for the intermediate position of the covering as shown in FIG. 2 & 6.
Figure 14:
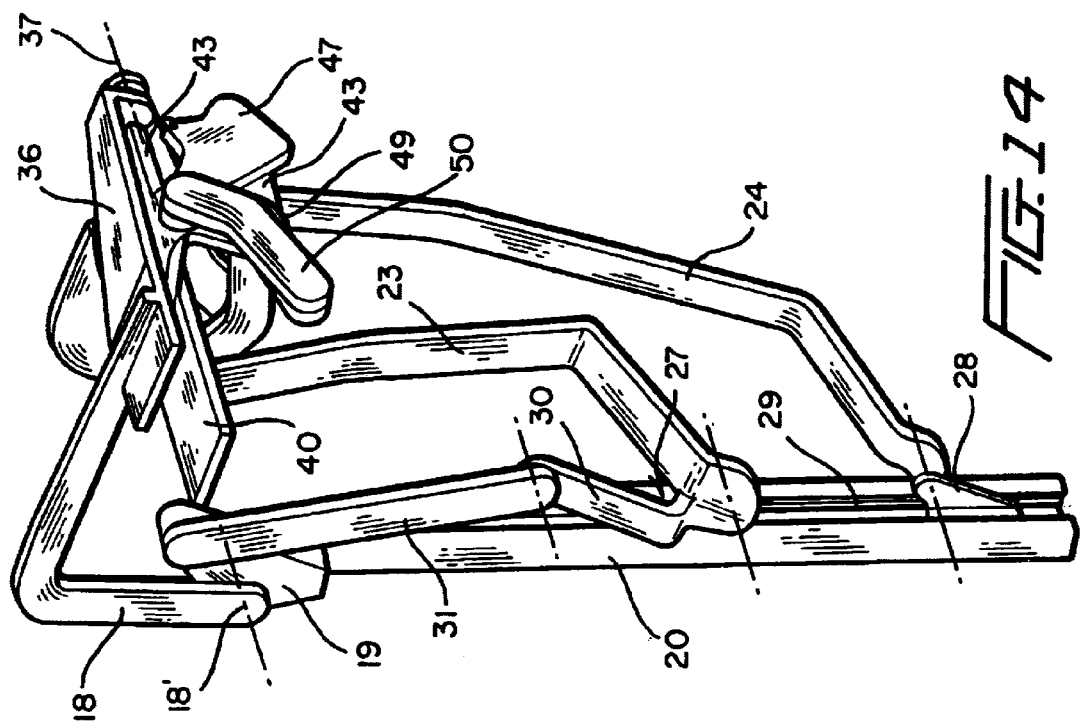
FIG. 14 is a view as shown in FIG. 13, but with the bearing and adjustment means in the deposited position of the covering as shown in FIG. 7.
Figure 12:
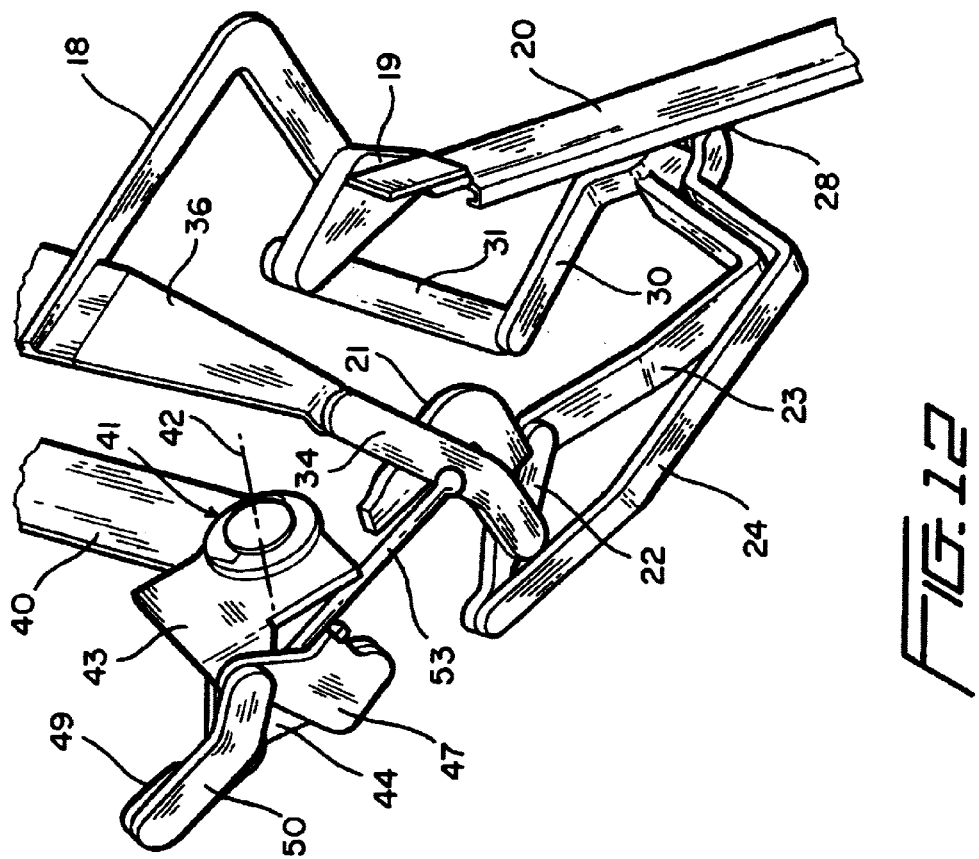
FIG. 12 is a perspective top view of the bearing and displacement means for the intermediate position of the covering between the positions of views of FIGS.

The carrier part 43 is fixed rotationally around the swivel axis 42 relative to the support part 40 over the first path of motion of the coupling rod 50 and the rod mechanism 45 by a lock means 56 (shown only in FIG. 8). After unlocking the lock means 56, for example, by a projection 57 of the control rod 47, during the second path of motion of the coupling rod 50, with the rod mechanism 45 stationary, and for example, adjoining the stop on the side wall 44 of the carrier part 43 with the control rod 47, the carrier part 43 is swivelled to the rear inwardly around the swivel axis 42, while at the same time and jointly with the support part 40 of the rear cover part 15, it is pivoted forward to the vertical (FIGS. 12 & 13).

The progression of the motion of the covering 4 when the convertible top 2 deposited in the convertible top compartment 5 is closed is explained below. Out of the closed position of the cover (FIGS. 1, 3 & 8), the two carriages 27, 28 which are coupled to one another by the drive means, for example, by a locking block means (not shown, described for example, in published German Patent Application DE 43 29 580 A1 for a sliding roof mechanism) or which are moved synchronously by their own drives, are moved downward out of their upper position on the bearing rail 20 (FIGS. 4 & 9). In doing so, the main and auxiliary connecting rods 23, 24 of the four-bar mechanism arrangement pivot forward and are guided down, pivoting the front cover part 14 forward around its fixed pivot axis 18' and raise it in doing so. The leg 22 of the carrier part 21 connecting the main connecting rod 23 and the auxiliary connecting rod 24 is moved forward and pivoted at the same time so that the rear cover part 15 is moved forward in the direction to the bottom of the front cover part 14, and in doing so, is tilted according to the front cover part 14.

Figure 11:
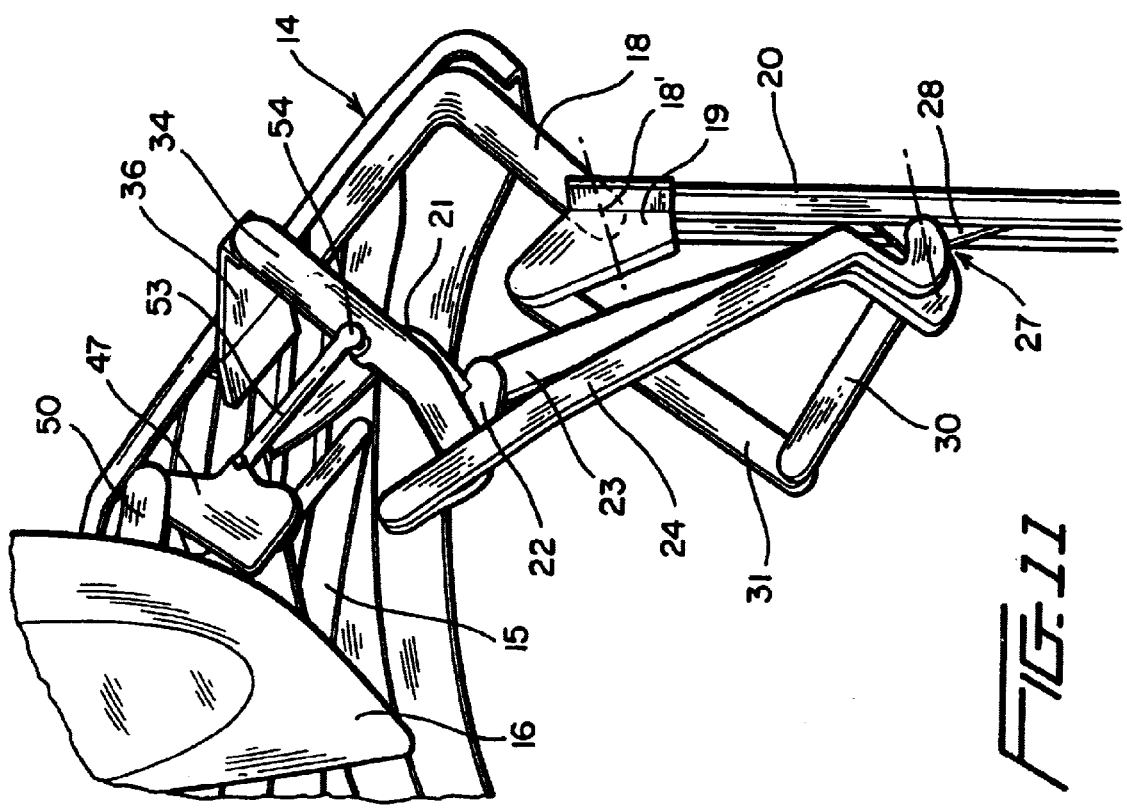
FIG. 11 is a perspective top view of the bearing and displacement means for the intermediate position of the covering as shown in FIG. 9.

The coupling rod 53 transfers the motion of the connecting arm 34 to the rod mechanism 45. Since, initially, the lock means 56 keeps the carrier part 43 locked against twisting, the rod mechanism 45 moves such that the retaining rod 49, and thus the lateral cover part 16 attached to it, are pivoted to the rear around the transversely aligned pivot axis of the hinge 48 as its front edge is raised (FIGS. 4, 9 & 11).

As the carriages 27, 28, a d thus the main connecting rod 23 and the auxiliary connecting rod 24, continue to move down, the described progression of motion continues until the retaining rod 49 of the rod mechanism 45, and thus the lateral cover part 16, are pivoted, for example, by roughly 180° and the rod mechanism 45 rests against a stop. With the last motion of the rod mechanism 45, the projection 57 unlocks the lock means 56 so that further motion of the coupling rod 53 relative to the rod mechanism 45 which lies on the stop, pivots the rod mechanism together with the carrier part 43 around the swivel axis 42 of the swivel hinge 41 inwardly to the rear (FIG. 12). Thus, the lateral cover part 16, with its bottom pointing obliquely forward and up (FIG. 5), is swung to under the rear cover part 15 and is raised simultaneously with it and the front cover part 14 roughly to the vertical (FIG. 6 and FIGS. 2 & 13).

At this point, the opening 37 of the convertible top compartment is cleared and the convertible top 2 can be extended out of the convertible top compartment 5 and moved over the covering 4 into its closed position which overlaps the vehicle interior (FIG. 2).

When the convertible top 2 is closed, or during the last path of motion of the convertible top 2 into the closed position, the carriage 28 of the auxiliary rod 24 is moved farther down, while the carriage 27 of the main connecting rod 23 is held securely in its position. Coupling and de-coupling can take place, for example, by means of the locking block means. The downward motion of the auxiliary connecting rod 24 pivots the leg 22, and thus the rear cover part 15 and the connecting arm 34, and thus the front cover part 14, around its pivot axis 18' on the head bearing part 19 by roughly 90° back into a roughly horizontal position (FIGS. 7 & 14) in which the covering 4 at least partially covers the front part of the opening 37 of the convertible top compartment 37, which top part is located under the closed convertible top 2, depending on the layout. The covering 4 in this lowered position forms, for example, a hat shelf which follows directly behind the seats 3 or which is spaced apart from them, so that a stowage space is still accessible from above behind the seats 3.

What is claimed is:

1. Covering of a convertible top compartment of a convertible which has a convertible top which can be deposited in the convertible top compartment, the covering having at least one first cover part and a second cover part which are supported to pivot relative to one another, wherein the covering is displaceable by a displacement mechanism between a closed position in which the convertible top is deposited in the convertible top compartment and the first cover part and the second cover part form a flat covering for the opening of the convertible top compartment, an intermediate position in which the first cover part and the second cover part are removed from the opening of the convertible top compartment and at least partially overlapped, located underneath a path of motion of the convertible top, and a deposited position in which the first cover part and the second cover part are located under the closed convertible top essentially lying on top of one another.

2. Covering of a convertible top compartment of a convertible which has a convertible top which can be deposited the convertible top compartment, the covering comprising at least a first over part and a second cover part which are supported to pivot relative to each other; wherein the first cover part is a front cover part and the second cover part is a rear cover part, wherein the cover parts are located in a closed position in transverse alignment in succession, and upon opening, are located at least partially overlapping one another in the same direction.

3. Covering of a convertible top compartment of a convertible which has a convertible top which can be deposited in the convertible top compartment, the covering having at least a first cover part and a second cover part which are supported to be pivot relative to one another; wherein the first cover part is a middle cover part and the second cover part is lateral cover part which, in a closed position, is supported on each of the two opposing lateral outside edges of the middle cover part and upon opening is pivotable relative to the middle part around two pivot axes.

4. Covering as claimed in claim 1, wherein the first cover part is a front cover part and the second cover part is a rear cover part; and wherein the cover parts are located in a transverse alignment behind one another in the closed position.

5. Covering as claimed in claim 1, wherein the first cover part is a middle cover part and the second cover part is a lateral cover part which, in the closed position, is supported on each of the two opposing lateral outside edges of the middle cover part.

6. Covering as claimed in claim 1, wherein the front cover part is supported to pivot around a front transverse axis on a body-mounted bearing and is pivotable by a connecting rod arrangement which is supported at one end on a guide to be moved by a drive and is pivotally connected to the front cover part at an opposite end.

7. Covering as claimed in claim 6, wherein the connecting rod arrangement comprises a four-bar mechanism arrangement which is pivotable around a support on the guide by forced control when moved along the guide, and in doing so, is adapted to pivot the front cover part via a connecting arm.

8. Covering as claimed in claim 7, wherein the four-bar mechanism arrangement comprises two connecting rods pivotally mounted on a carrier part of the rear cover part by hinges which are spaced apart from one another, the two connecting rods being pivotable with respect to each other when moved along the guide by the carrier part, pivoting the rear cover pact with a superimposed swivelling motion.

9. Covering as claimed in claim 8, wherein the connecting arm is pivotally supported on the carrier part and on the front cover part.

10. Covering as claimed in claim 8, wherein the two connecting rods of the four-bar mechanism arrangement are each pivotally supported on a respective carnage that is movably supported on the guide, and in an initial displacement motion which moves the cover parts from the closed position into the intermediate position, the carriages are movable coupled to one another; and wherein to move the cover parts into the deposited position, of the connecting rods is moved further on the guide, while the other of the connecting rods is kept locked by means of its carriage on the guide, so that the two cover parts are pivoted back into the deposited position via the carrier part.

11. Covering as claimed in claim 1, wherein one of the second cover part and a side part is supported to be able to pivot around a first pivot axis on one of the first cover part and a rear cover part down out of the closed position in an opposite direction to a pivoting motion of the rear cover part into a swing-out position and in doing is displaceable to a level at one of top and bottom sides of the rear cover part, and wherein the side part is supported to be able to swivel around swivel axis of a swivel joint which is supported on the rear cover part, such that it can be swivelled to a position at one of top and bottom sides of the rear cover part.

12. Covering as claimed in claim 10, wherein a side part is attached to a retaining rod of a rod mechanism which is coupled to the connecting arm and is movable controlled by the retaining rod.

13. Covering as claimed in claim 12, wherein the rod mechanism is movably supported on a bearing part which is kept locked during an adjustment motion of the side part into a swing-out position on a swivel, and in the swing-out position, the rod mechanism is in an end position and after unlocking of a swivel axis, the bearing part is swingable with the side part held on it to under the rear cover part.

14. Covering as claimed in claim 1, wherein the cover parts are ported via bearing means on two guides which are on laterally opposite sides of a motor vehicle.

15. Covering as claimed in claim 14, wherein the guides run essentially vertically.

\* \* \* \* \*